United States Patent [19]

Gardell et al.

[11] Patent Number: 5,141,292

[45] Date of Patent: Aug. 25, 1992

[54] METHOD AND ARRANGEMENT FOR BRAKE ADAPTATION BETWEEN A HAULAGE VEHICLE AND AN ATTACHED SEMITRAILER

[75] Inventors: Lars Gardell, Enhörna; Rolf Fredriksson, Järna; Göran Magnusson, Haninge, all of Sweden

[73] Assignee: Saab-Scania Aktiebolag, Sweden

[21] Appl. No.: 659,387

[22] PCT Filed: Aug. 28, 1989

[86] PCT No.: PCT/SE89/00449

§ 371 Date: Mar. 5, 1991

§ 102(e) Date: Mar. 5, 1991

[87] PCT Pub. No.: WO90/02675

PCT Pub. Date: Mar. 22, 1990

[30] Foreign Application Priority Data

Sep. 9, 1988 [SE] Sweden .................. 8803179

[51] Int. Cl.$^5$ .................. B60T 13/68; B60T 8/36; B60T 8/58
[52] U.S. Cl. .................. 303/7; 303/9.69; 303/113 AP; 303/DIG. 4
[58] Field of Search ...... 303/113 R, 113 AP, DIG. 3, 303/DIG. 4, 3, 7, 8, 9.62, 9.66–9.69, 22.1, 24.1, 95, 97, 100, 111, 109, 118; 364/426.02

[56] References Cited

U.S. PATENT DOCUMENTS

| | | | |
|---|---|---|---|
| 3,232,674 | 2/1966 | Stelzer | 303/7 |
| 3,410,609 | 11/1968 | Henry-Biaband | 303/7 |
| 3,909,075 | 9/1975 | Pittet, Jr. et al. | 303/24.1 |
| 4,327,414 | 4/1982 | Klein | 364/426.02 |
| 4,603,921 | 8/1986 | Liggett | 303/9.69 |
| 4,768,840 | 9/1988 | Sullivan et al. | 303/22.1 X |
| 4,795,219 | 1/1989 | Brearley et al. | 303/9.69 |
| 4,818,035 | 4/1989 | McNinch, Jr. | 303/7 |
| 4,984,852 | 1/1991 | McNinch, Jr. | 303/7 X |

FOREIGN PATENT DOCUMENTS

| | | | |
|---|---|---|---|
| 292687 | 11/1988 | European Pat. Off. | 303/7 |
| 370671 | 5/1990 | European Pat. Off. | 303/7 |
| 2339517 | 8/1977 | France . | |
| 86/01779 | 3/1986 | PCT Int'l Appl. . | |
| 455854 | 8/1988 | Sweden . | |

*Primary Examiner*—Robert J. Oberleitner
*Assistant Examiner*—Alfred Muratori
*Attorney, Agent, or Firm*—Ostrolenk, Faber, Gerb & Soffen

[57] ABSTRACT

In a vehicle combination consisting of a haulage truck (1) and a semitrailer (2) the brake system of the haulage truck (1) comprises a control valve (8) which allows the brake pressure imparted to the brakes (4) of the semitrailer (2) to be adapted to the brake pressure imparted to the brakes (3) of the haulage truck (1). The adaptation is carried out with the use of an electrical control unit (16), in which the actual deceleration of the vehicle during a braking sequence is compared to an expected deceleration. In the event of a discrepancy between these, a control member (15) on the control valve (8) is actuated automatically so that the semitrailer (2) is supplied with a higher or lower brake pressure relative to the haulage vehicle (1) depending on whether the actual deceleration was lower or higher than the expected deceleration. As a result of the adaptation, the brakes of the haulage truck (1) and of the semitrailer (2) can be used better under various operating conditons.

10 Claims, 2 Drawing Sheets

METHOD AND ARRANGEMENT FOR BRAKE ADAPTATION BETWEEN A HAULAGE VEHICLE AND AN ATTACHED SEMITRAILER

The invention relates to a system and a method for brake adaptation between a haulage vehicle and an attached semitrailer.

Prior Art

In relatively heavy vehicle combinations an adaptation must be made between the braking systems of a haulage vehicle and an attached semitrailer. In this connection the principal aim is to let each wheel axle be responsible for the braking of the load which rests on the respective axle in order to obtain an uniform a load as possible on the brakes of the respective wheels. Should one brake absorb too great a share of the total braking work, this results in the brakes being overloaded and being worn abnormally quickly. If, on the other hand, the brakes are underloaded, this results in an unnecessarily long braking distance.

The laws and regulations which determine the braking characteristics of vehicles permit a certain difference to exist between different vehicle parts. In cases where the haulage truck and semitrailer have different braking characteristics this can result, when there is relatively low brake pressure, in only the brakes of the haulage vehicle being applied and thereby having to brake the entire vehicle unit. This disadvantage can be further aggravated for example in older semitrailers, where the brakes can often seize on account of corrosion and poor maintenance. Very few braking operations normally take place with fully applied brakes. Instead, the majority of braking operations take place with low or moderate brake pressure, with the result that the problem discussed above manifests itself. As a result of this the brake linings of the haulage truck are loaded to an unnecessary extent, and they are consequently worn out quickly and therefore have to be frequently changed.

Another point of interest is that, in the case of a semitrailer, part of its load is absorbed by the wheels of the haulage truck and another part by the wheels of the semitrailer. As already mentioned, the principal aim is that each wheel should be responsible for the braking work which is required for the mass resting on the respective wheel. This means that, depending on how the semitrailer is loaded, the haulage truck must absorb different degrees of braking work.

There is at present no satisfactory solution to the problem described. There are certain types of control valves for the brakes of the semitrailer, which valves allow the pressure imparted to the brakes of the semitrailer to be manually adjusted, within certain limits, relative to the pressure imparted to the brakes of the haulage truck. However, such an adjustment requires comprehensive measuring equipment, and even when adjustment is carried out for a particular semitrailer it is not certain that the same adjustment is suitable for another semitrailer. This adjustment can also only be made for a specific load and, in the event of reloading or another freight, the conditions for the adjustment are altered. All these disadvantages of manual adjustment have meant that a single adjustment is made once only which is suitable for the most general driving conditions, and no further adjustment is then made.

In the case of a trailer, which unlike a semitrailer completely supports its own load, it is known to arrange force sensors which, during braking sequences, detect the force acting on it drawbar. If, during a braking sequence, a tensile force is detected acting on the drawbar, this is an indication that the brakes of the trailer are responsible for too large a proportion of the braking work. Correspondingly, a compressive force on the drawbar indicates that the brakes of the trailer are responsible for tool small a proportion of the braking work. Depending on these indications a control valve for the brakes of the trailer is actuated so as to increase or decrease the brake pressure imparted to the brakes of the trailer. This technique cannot however be directly transferred to a semitrailer, since in this case a certain proportion of the load of the semitrailer is to be braked by the brakes of the haulage vehicle.

OBJECT OF THE INVENTION

The object of the present invention is to solve the problem discussed and thus to provide a brake adaptation of the braking system of the semitrailer as a function of the braking system of the haulage truck. By this means their respective braking systems can be better used. One object of the invention is that this adaptation should take place automatically and should be able to be carried out individually for the specific semitrailer which at the time is attached to the haulage truck. When the semitrailer are changed, an automatic adaptation shall take place with regard to the new semitrailer.

The invention relates both to a system and a method for carrying out brake adaptation between a haulage vehicle and an attached semitrailer.

The invention results in the haulage truck and semitrailer each being responsible for a braking work corresponding to the axle pressure borne by the respective axle to an essentially better extent than is the case in the known solutions. This means that the brake linings are loaded and worn more evenly.

The invention also results in it being possible for the same haulage truck to be used together with different semitrailers, whose braking systems have different braking properties, in which connection the advantages of the invention are obtained regardless of which semitrailer is chosen.

Further features and advantages characterizing the invention will emerge from the attached illustrative description of an advantageous embodiment.

BRIEF DESCRIPTION OF THE DRAWINGS

The illustrative description is given with reference to the attached drawings in which.

DESCRIPTION OF AN EXEMPLARY EMBODIMENT

Figure 1:
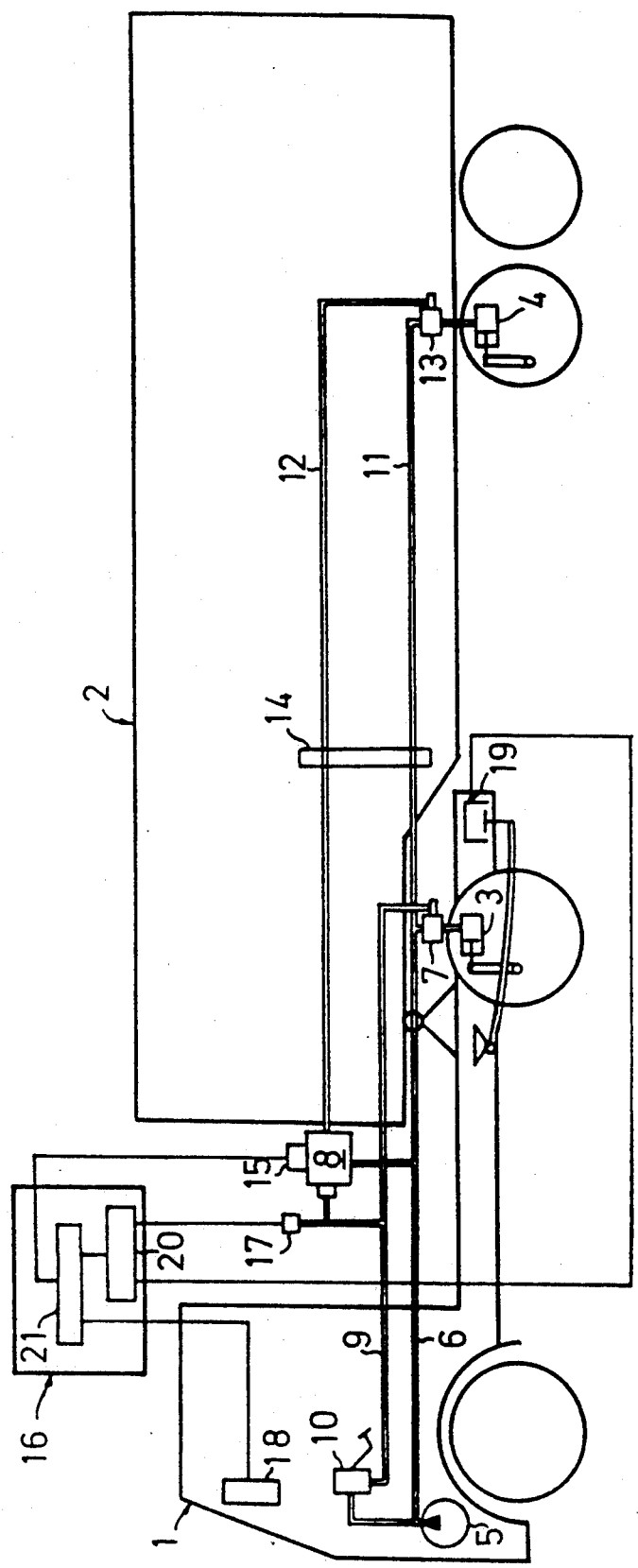
FIG. 1 shows a haulage truck with attached semitrailer, with various components in their respective braking systems being shown diagrammatically.

Attached FIG. 1 shows diagrammatically a vehicle consisting of a haulage truck 1 and an attached semitrailer 2. The haulage truck 1 and the semitrailer 2 are equipped with pneumatic brake systems, which are conventional per se, for activation of brake members on each wheel. However, since the design of such pneumatic brake systems is well known in connection with at least relatively heavy vehicles, the following description is limited to including only those parts which are of importance for describing the present invention. For the purpose of simplifying the description, simplified brake systems are therefore exemplified.

The brake system of the haulage truck 1 comprises a compressed air source 5 in the form of a compressor. This is connected via a supply line 6 to, on the one hand, a relay valve 7 of the brake member 3 on the rear wheel of the haulage truck and, on the other hand, to a control valve 8 for the semitrailer 2, generally called the control valve of the trailer. Both these valves 7, 8 are connected via an operating pressure line 9 to a brake control valve 10, which is controlled by means of a brake pedal which can be actuated by the vehicle driver. The brake control valve 10 is also supplied with compressed air from the compressed air source 5 and, depending on the position of the brake control valve 10, the operating pressure line 9 is supplied with a certain brake pressure Pb.

The brake system of the semitrailer 2 similarly comprises a supply line 11 and an operating pressure line 12 connected to a relay valve 13 on the brake member 4 on the wheel of the semitrailer. The supply line 11 is connected to the supply line 6 of the haulage truck 1 and the operating pressure line 12 is connected to the control valve 8 of the haulage truck 1 for the semitrailer 2. The operating pressure line 12 and supply line 11 of the semitrailer 2 comprise coupling pieces which connect the brake system of the semitrailer 2 to the brake system of the haulage truck 1. The coupling pieces are shown diagrammatically in FIG. 1 as a coupling block 14. The figure shows the coupling block 14 in a displaced position. In practice the coupling block 14 is positioned in a suitable space between the haulage vehicle 1 and the semitrailer 2. The control valve 8 for the semitrailer 2 is designed to emit, depending on the operating pressure Pb which is emitted by the brake control valve 10, an operating pressure for the semitrailer 2, which operating pressure can be higher than, lower than or equal to the operating pressure Pb of the haulage truck. The control valve 8 comprises a control member 15 for controlling the operating pressure of the semitrailer 2 as a function of the operating pressure of the haulage truck. This control thus means that the braking work can be divided between the brake members 3, 4 of the haulage truck 1 and the semitrailer 2.

In accordance with the present invention the brake system of the haulage truck 1 also comprises an electrical control unit 16 which is connected to a number of sensors detecting different vehicle parameters. In this example the control unit 16 is connected to an electrical pressure sensor 17 in the operating pressure line 9 of the haulage truck 1. The control unit 16 is thereby supplied with a signal representing the brake pressure Pb of the haulage truck 1, which pressure is in itself dependent on the activation of the driver-actuated brake control valve 10. This signal can therefore also be regarded as representing a braking capacity desired by the driver.

The control unit 16 is also connected to a deceleration sensor 18, which in FIG. 1 is only shown diagrammatically. In practice the deceleration sensor 18 can be made up of a sensor which, during a time sequence, detects the speed of rotation of at least one of the wheels of the vehicle and whose signal is converted by means of conventional signal processing to represent the deceleration.

In an alternative embodiment the deceleration sensor 18 can be made up of a pendulum sensor, whose swing amplitude is directly proportional to the deceleration. A pendulum sensor has the advantage of automatically adapting its output signal with regard to the inclination of the vehicle when the latter is on a slope. Such a pendulum sensor can therefore also be used together with a deceleration sensor of the abovementioned design, detecting the wheel speed in order to compensate the signal representing the deceleration with regard to the inclination of the vehicle.

A third sensor 19 is connected to the control unit 16, which sensor 19 detects the load on the rear axle of the haulage truck 1. Provided that the haulage truck 1 is equipped with air suspension, this sensor 19 can in practice be made up of a pressure sensor arranged in the compressed air bellows of the spring suspension, as shown in FIG. 1. Should the haulage truck 1 not have such a spring suspension, another conventional sensor can be arranged to detect the axle load for the rear wheels of the haulage truck 1. The said three sensors 17, 18, 19 are thus designed to detect and supply the control unit 16 with signals representing the said vehicle parameters.

The control unit 16 comprises a memory unit 20 and a comparative circuit 21. In the memory unit 20 various predetermined values are programmed in for the expected deceleration of the vehicle as a function of the brake pressure Pb of the haulage truck 1 and the axle load of the rear wheels of the haulage truck 1. The sensors 17, 19 detecting these two vehicle parameters are connected to the memory unit 20 and emit, as a function thereof, an output signal representing an expected deceleration under the actual conditions. This output signal is supplied to the comparative circuit 21, to which there is also supplied a signal from the deceleration sensor 18 detecting the actual deceleration. The comparative circuit 21 compares these signals and emits an output signal representing the discrepancy. The comparative member 21 of the control unit 16 is electrically connected to the control member 15 for the control valve 8 for the semitrailer 2. The control member 15 can be made up, for example, of an electrical stepping motor which mechanically influences the control valve to change its position such that the operating pressure which is emitted to the operating pressure line 12 of the semitrailer 2 is modified as a function thereof.

In an alternate embodiment the control member 15 can be made up of an electrically activatable pneumatic proportional valve, the position of the control valve 8 being modified pneumatically.

Figure 2:
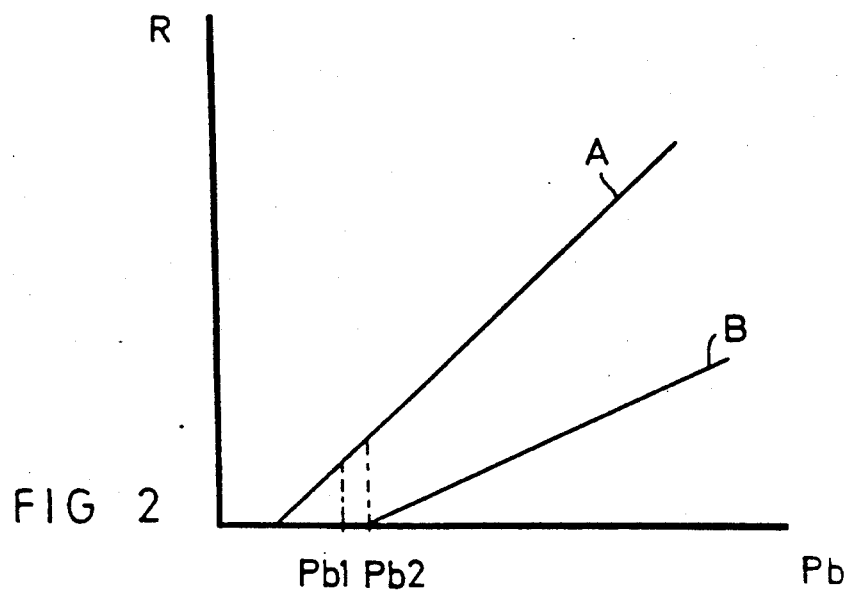
FIG. 2 shows a diagram of the individual deceleration of the haulage truck and the semitrailer at different brake pressures and in a non-adapted condition.

The function of the described arrangement is as follows. It is assumed that the haulage truck 1 and the semitrailer 2 have recently been connected to each other and that their respective brake systems have not been adapted to each other. FIG. 2 shows the character of the individual deceleration R of the haulage truck 1 and semitrailer 2 for different brake pressures Pb in the operating pressure line 9 of the haulage truck 1. The line A represents the deceleration of the haulage truck and the line B the deceleration of the semitrailer. The deceleration of the whole vehicle combination corresponds to a mean (not shown) of these two curves in proportion to the respective weight of the haulage truck and the semitrailer. Thus, if the haulage truck 1 and the semitrailer 2 have the same weight, the mean of the curves will lie exactly midway between the two curves A and B shown. If, on the other hand, one of the vehicle parts 1, 2 has a greater part of the total weight of the vehicle combination than the other vehicle part, the curve for the mean will correspondingly lie closer to that one of curves A and B which corresponds to the heavier of the vehicle parts 1, 2. As emerges from the line B in FIG. 2, the brakes of the semitrailer 2 start to be applied at a considerably higher brake pressure Pb2 than the brakes of the haulage truck 1. At low brake pressures up to Pb2 the brakes of the semitrailer 2 do not effect any braking work. The fact that the brakes of the semitrailer 2 exhibit this characteristic may be due to its brake system being mechanically more power-consuming, for example on account of rust formation or because it is unlubricated. Regardless of the reason, it is desirable in this case to increase the operating pressure which is imparted to the operating pressure line 12 of the semitrailer.

When the vehicle combination is decelerated there arises in the operating pressure line 9 of the haulage truck 1 a brake pressure Pb which, in accordance with FIG. 2, applies the brakes. The pressure sensor 17 in the operating pressure line 9 and the load sensor 19 emit to the memory unit 20 of the control unit 16 signal values representing these vehicles parameters. The memory unit 20 thereby emits a signal representing an expected deceleration, which signal is compared in the comparative circuit 21 to a signal representing the actual deceleration from the deceleration sensor 18. In this case the share of the braking work effected by the semitrailer 2 is small if anything, and as a result of this the actual deceleration is lower than the expected deceleration. The comparative circuit 21 therefore emits an output signal which indicates that the operating pressure to the semitrailer 2 should be increased. However, this adjustment does not take place until the braking sequence is complete. In order for the control system 16 to be able to detect that a braking sequence is complete, a detection member intended for this purpose is provided (not shown). This detection member can advantageously be combined with the pressure sensor 17 for the brake pressure of the haulage truck. If the brake pressure is zero, this is an indication that a braking sequence is complete. When the actual braking sequence has been completed, the output signal from the control unit 16 to the control member 15 of the control valve 8 influences its position so that it results in the operating pressure to the semitrailer being increased before the next deceleration. This adjustment can take place either with a certain predetermined step, for example 0.1 bar, for each deceleration or with a complete adjustment, corresponding directly to the discrepancy noted in the comparative circuit 21, for each deceleration. Assuming that the adjustment takes place stepwise, then after a number of decelerations the brakes of the haulage truck and the semitrailer come to be adapted to each other.

Figure 3:
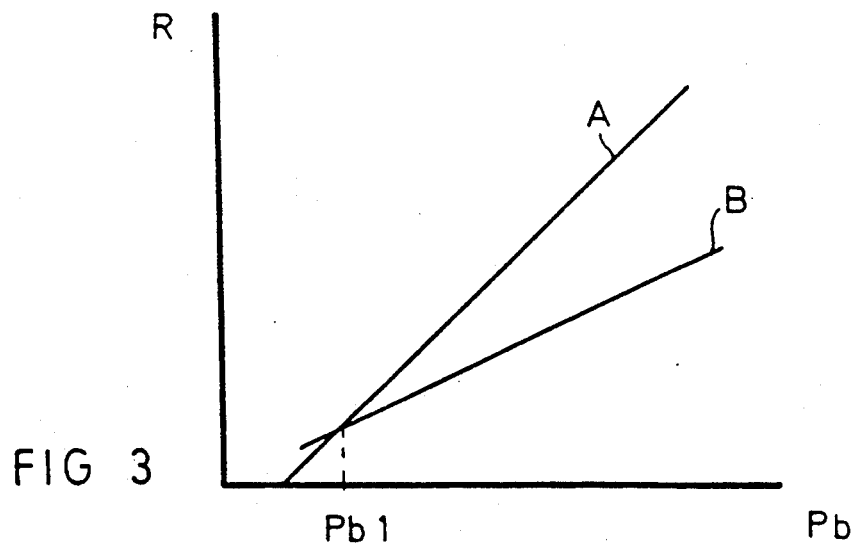
FIG. 3 shows a corresponding diagram after brake adaptation has been carried out.

Attached FIG. 3 shows the character of the deceleration R of the semitrailer and the haulage truck as a function of the brake pressure Pb after their brakes have been adapted to each other in the abovementioned manner. The brakes of the haulage truck 1 exhibit, according to line A, the same characteristics as in FIG. 2, while, on the other hand, the brakes of the semitrailer 2 according to line B have been moved parallel relative to what is shown in FIG. 2. This adjustment applies primarily to a certain specific brake pressure Pb1. It is unlikely that a subsequent deceleration will take place with the same brake pressure. If the brake pressure upon a subsequent deceleration is lower than this pressure Pb1, an excessive deceleration will be detected in analogy with what has been described above. This is an indication that the brakes of the semitrailer 2 are performing an excessive braking work for the actual brake pressure Pb. The control unit 16 therefore effects an adjustment which results in the operating pressure to the semitrailer being decreased relative to the operating pressure to the brakes of the haulage truck. In an analogous manner then operating pressure to the semitrailer increases if the braking is effected with a pressure exceeding Pb1. The control unit in this way continuously and automatically adapts the brake systems of the haulage truck and the semitrailer to each other. Should, for example, the load of the semitrailer be significantly altered, this will result in other conditions which alter the expected deceleration, adaptation being effected in accordance with these new conditions.

The adaptation is most urgent in the case of relatively low brake pressures, since the majority of decelerations are effected with low brake pressures. The adaptation described is therefore intended primarily to take place when the brake pressure is less than a predetermined pressure, which is advantageously of the order of magnitude of 2 bar. A conventional pneumatic compressed air brake system normally operates with pressures up to about 7 bar. The stated limit under which adjustment is carries out thus corresponds to about 30% of the maximum existing pressure. In the case of braking with higher brake pressures, no adjustment need therefore take place which affects the position of the relay valve. Despite the fact that two consecutive decelerations do not take place with exactly the same brake pressure Pb, the discrepancy between the two curves is extremely small, or at least much less than when no brake adjustment is carried out. As a result of this the individual decelerations of the haulage truck 1 and the semitrailer 2 are nevertheless sufficiently similar to each other for a satisfactory distribution of the braking work to be obtained.

In a more developed variant of the invention the control unit is supplied with further vehicle parameters of significance for the adjustment. Among these parameters there may be mentioned the motor speed of the drive motor of the haulage truck in order to indicate the motor brake function. If motor brake function is present, the drive wheels perform a certain braking work which in other cases is not noted. This would result in false information being supplied to the control unit regarding the braking work which is actually carried out. The same applies when the vehicle is equipped with an additional brake, a so-called retarder, in which connection the control unit should be supplied with a signal which indicates when it is activated. If the vehicle is equipped with an automatic brake control system (ABS), the control unit should likewise be supplied with a signal which indicates when it is activated. These signals can be used to modify or adapt the control unit's adjustment of the control valve of the semitrailer. In this context it should be noted that the invention is particularly advantageous in a vehicle equipped with an automatic brake control system (ABS). Such a system ensures that none of the wheels of the vehicle are locked, which means that the brake adaptation can be carried out without regard to the risk of wheels locking.

In the example described, which shows a simplified braking system, nothing has been said of the brake members on the front wheels of the haulage truck. Brake members which are conventional per se are advantageously arranged on these.

The invention can be further modified within the scope of the attached patent claims and can be designed other than has been stated in the example described. The invention is not limited to purely pneumatic brake systems, but can also be used, for example, in electropneumatic brake systems. In such a case the control member of the control valve can be made up of an electrical circuit which effects the control by means of suitable signal processing. No mechanical or pneumatic control of the same valve is thus required if this is electrically operated, as is customary in electropneumatic brake systems.

We claim:

1. A system for braking adaptation between a haulage vehicle and a semitrailer which include respective brakes operative in response to respective brake valves, the brake valves being operative in response to respective operating pressures and to a brake pressure of the haulage vehicle, which comprises:
   a selectively variable control valve for applying operating pressure to the brake valve of the haulage vehicle and the brake valve of the semitrailer to operate their respective brakes in response to the brake pressure of the haulage vehicle to cause deceleration of said haulage vehicle;
   an electrical control unit comprising a memory unit and a comparative circuit cooperating therewith, the memory unit containing stored valves for an expected deceleration as a function of vehicle parameters for the haulage vehicle;
   respective sensors for sensing said vehicle parameters and the deceleration of the haulage vehicle and for generating corresponding electrical signals;
   means for connecting each of the sensors to the electrical control unit such that the memory unit generates a control signal representative of an unexpected deceleration and the comparative circuit compares the signal representative of an expected deceleration from the memory unit with the signal representing the deceleration of the haulage vehicle from the sensor therefor, the electrical control unit generating a control signal in the event of a discrepancy between said signals, said control signal from the electrical control unit being generated only after a completed braking sequence, and
   varying means responsive to the control signal from the electrical control unit for varying the control valve such that the brake valve of the semitrailer is supplied with a lower or a higher operating pressure as a function of the discrepancy between the deceleration of the haulage vehicle and the expected deceleration thereof.

2. A system according to claim 1, wherein the sensors include sensors for detecting the brake pressure of the haulage vehicle and a load which rests on the haulage vehicle.

3. A system according to claim 2, wherein the electrical control unit generates the control signal only when the brake pressure of the haulage vehicle is below a certain predetermined value.

4. A system according to claim 2, wherein control of the varying means is carried out stepwise with a predetermined value for each step such that the operating pressure imparted to the brake valve of the semitrailer is modified upon each application of the control signal from the electrical control unit to the varying means by a predetermined value.

5. A method of brake adaptation between a haulage vehicle and a semitrailer which includes respective brake valves operative in response to respective pressures, which comprises:
   sensing during a braking sequence a plurality of vehicle parameters which affect vehicle deceleration and generating corresponding electrical signals;
   detecting during the braking sequence the deceleration of the vehicle and generating a corresponding electrical signal;
   deriving a signal representative of an expected deceleration from the signals corresponding to the vehicle parameters;
   comparing the signal representative of an expected deceleration with the signal corresponding to the detected deceleration; and
   if there is a discrepancy between the expected and the detected deceleration, lowering or increasing the operating pressure applied to the brake valve of the semitrailer as a function of such discrepancy only after completion of a braking sequence.

6. A method according to claim 5, wherein the vehicle parameters include the brake pressure of the haulage vehicle and a load which rests on the haulage vehicle.

7. A method according to claim 6, wherein if there is a discrepancy between the expected and the detected deceleration, the operating pressure applied to the brake valve of the semitrailer is lowered or increased only when the brake pressure of the haulage vehicle is below a predetermined value.

8. A system for brake adaptation between a haulage vehicle and a semitrailer which include respective brakes operative in response to respective brake valves, the brake valves being operative in response to respective operating pressures and to a brake pressure of the haulage vehicle, which comprises:
   a selectively variable control valve for applying operating pressure to the brake valve of the haulage vehicle and to the brake valve of the semitrailer to operate the respective brakes in response to the brake pressure of the haulage vehicle to cause deceleration of said haulage vehicle;
   an electrical control unit comprising a memory unit and a comparative circuit cooperating therewith, the memory unit containing stored values for an expected deceleration as a function of the brake pressure of the haulage vehicle and a load which rests on the haulage vehicle;
   respective sensors for sensing the brake pressure of the haulage vehicle and said load and the deceleration of the haulage vehicle and for generating corresponding electrical signals;
   means for connecting each of the sensors to the electrical control unit such that the memory unit generates a control signal representative of an expected deceleration and the comparative circuit compares the signal representative of an expected deceleration from the memory unit with the signal representing the deceleration of the haulage vehicle from the sensor therefor, the electrical control unit generating a control signal in the event of a discrepancy between said signals, said control signal from the electrical control unit being generated only when the brake pressure on the haulage vehicle is less than approximately 30% of a maximum existing brake pressure, and varying means responsive to the control signal from the electrical control unit for varying the control valve such that the brake valve of the semitrailer is supplied with a lower or a higher operating pressure as a function of the discrepancy between the deceleration of the haulage vehicle and the expected deceleration thereof.

9. A system according to claim 8, wherein the varying means includes a control member connected to the control valve for operating the same, the control member being connected to the electrical control unit such as to be responsive to the control signal therefrom.

10. A method of brake adaptation between a haulage vehicle and a semitrailer which include respective brake valves operative in response to respective operating pressures, which comprises:

sensing during a braking sequence a plurality of vehicle parameters, including a brake pressure of the haulage vehicle and a load which rests on the haulage vehicle, which affect vehicle deceleration and generating corresponding electrical signals;

detecting during the braking sequence the deceleration of the vehicle and generating a corresponding electrical signal;

deriving a signal representative of an expected deceleration from the signals corresponding to the vehicle parameters;

comparing the signal representative of an expected deceleration with the signal corresponding to the detected deceleration; and if there is a discrepancy between the expected and the detected deceleration, lowering or increasing the brake pressure applied to the brake valve of the semitrailer as a function of such discrepancy after the completion of a braking sequence and only when the brake pressure of the haulage vehicle is below a predetermined valve approximately equal to 30% of a maximum existing brake pressure.

* * * * *